(12) United States Patent
Kim et al.

(10) Patent No.: US 7,680,521 B2
(45) Date of Patent: Mar. 16, 2010

(54) BATTERY PACK LOCKING DEVICE OF A MOBILE PHONE

(75) Inventors: Jae-Shik Kim, Seongnam-si (KR); Hong-Bae Kim, Yongin-si (KR); Hyon-Myong Song, Daegu (KR)

(73) Assignee: Samsung Electronics Co., Ltd. (KR)

( * ) Notice: Subject to any disclaimer, the term of this patent is extended or adjusted under 35 U.S.C. 154(b) by 1041 days.

(21) Appl. No.: 11/372,965

(22) Filed: Mar. 10, 2006

(65) Prior Publication Data

US 2006/0209177 A1 Sep. 21, 2006

(30) Foreign Application Priority Data

Mar. 21, 2005 (KR) .................. 10-2005-0023263

(51) Int. Cl.
*H04M 1/00* (2006.01)
(52) U.S. Cl. ............... 455/575.4; 455/550; 455/575.1; 429/99; 429/97; 345/1
(58) Field of Classification Search ............. 455/575.8, 455/575.1; 429/97, 100
See application file for complete search history.

(56) References Cited

U.S. PATENT DOCUMENTS

| | | | | |
|---|---|---|---|---|
| 5,317,247 A * | 5/1994 | Chong et al. | ............. | 320/112 |
| 5,535,437 A * | 7/1996 | Karl et al. | ............. | 455/575.1 |
| 5,642,404 A * | 6/1997 | Hsu | ............. | 455/575.1 |
| 5,716,730 A * | 2/1998 | Deguchi | ............. | 429/97 |
| 5,738,954 A * | 4/1998 | Latella et al. | ............. | 429/97 |
| 6,120,932 A * | 9/2000 | Slipy et al. | ............. | 429/99 |
| 6,710,576 B1 * | 3/2004 | Kaufman et al. | ............. | 320/107 |
| 2002/0013161 A1 | 1/2002 | Schaeffer et al. | | |
| 2002/0028693 A1 * | 3/2002 | Johnson | ............. | 455/550 |
| 2004/0009789 A1 | 1/2004 | Park et al. | | |
| 2004/0075620 A1 * | 4/2004 | Tanaka et al. | ............. | 345/1.1 |
| 2004/0192418 A1 * | 9/2004 | Nam | ............. | 455/575.1 |
| 2005/0013434 A1 * | 1/2005 | Qin et al. | ............. | 379/433.12 |

FOREIGN PATENT DOCUMENTS

| | | |
|---|---|---|
| DE | 19806508 | 8/1999 |
| EP | 1 427 035 | 6/2004 |
| EP | 1 513 323 | 3/2005 |

\* cited by examiner

*Primary Examiner*—Charles N Appiah
*Assistant Examiner*—Kwasi Karikari
(74) *Attorney, Agent, or Firm*—The Farrell Law Firm, LLP

(57) ABSTRACT

Disclosed is a battery pack locking device for a mobile phone which attaches or detaches the battery pack to or from a body of the phone by slidably moving a cover of a camera lens module. The battery pack locking device includes a sliding cover; a push locker portion moved upwardly or downwardly according to movement of the sliding cover; a slide locker portion slidably moved according to the upward or downward movement of the push locker portion to restrict or release the battery pack; and a resilient member.

15 Claims, 14 Drawing Sheets

BATTERY PACK LOCKING DEVICE OF A MOBILE PHONE

PRIORITY

This application claims priority to an application entitled "BATTERY PACK LOCKING DEVICE OF MOBILE PHONE" filed in the Korean Industrial Property Office on Mar. 21, 2005 and assigned Serial No. 2005-23263, the contents of which are hereby incorporated by reference.

BACKGROUND OF THE INVENTION

1. Field of the Invention

The present invention relates to a battery pack locking device of a mobile phone, and more particularly to a battery pack locking device of a mobile phone that attaches or detaches the battery pack to or from a body of the phone by slidably moving a cover of a camera lens module.

2. Description of the Related Art

Generally, as a power source of a mobile phone, a battery pack is detachably mounted to a rear surface of the phone. The battery pack is attached or released by a locking device portion installed in the body.

To mount the battery pack onto the phone, the battery pack is slidably mounted on a rear surface of the body using a guide rib and locked in place by moving the battery pack downwardly with respect to a catching piece after catching an end of the battery pack at the catching piece.

Terminals are installed on front and rear surfaces of the lower end of the battery pack so as to be exposed. The terminal installed on one side surface of the battery pack is in contact with a connecting terminal protruding from the rear surface of the body, and the terminal installed on the other side surface thereof is in contact with a connecting terminal of a charger while charging the battery.

As shown in FIG. 1, according to a battery pack locking device of a conventional mobile phone, a battery pack 10 is engaged on a rear surface of a body comprised of a lower casing frame 1a.

A mounting surface 1b is formed on the rear surface of the lower casing frame 1a. A connecting terminal (not shown) protrudes from one end of the mounting surface 1b, and a mounting portion 1c is formed at a predetermined position on the rear surface of the lower case frame 1a at the other end of the mounting surface 1b. A locking device portion 20 is provided at the mounting portion 1c to fix the battery pack 10 to the mobile phone body 1.

When mounting the above-mentioned battery pack 10 to the body 1, the battery pack 10 is first engaged with the mounting surface 1b formed on the rear surface of the body 1. Then, lockers 21 are caught in a catching recess 11 formed in the battery pack 10. The battery pack is securely fixed to the body 1 by the locker 21.

To separate the battery pack 10 from the body 1, if the lockers 21 are pulled horizontally and moved in a slidable manner, the lockers 21 are extracted from the catching recess and thus are separated from the body 1.

Then, a moving space of a predetermined size is formed in the mounting portion so that the lockers 21 are moved horizontally in a slidable manner.

As shown in FIG. 2, which is a cross-sectional view of a conventional battery pack locking device, the battery pack locking device includes at least one guide rib 23 mounted on the lower casing frame 1a of the body 1 of the phone to guide the locking device vertically.

Since a catching portion 23a is formed at one end of the guide rib 23 and thus is caught by a stopping portion 2 formed in the lower case frame 1a, once the locker 21 is mounted, it is locked in place and prevented from moving outwardly during the horizontal and slidable movement thereof. A spring is used as a resilient means to provide the locker 21 with a resilient force, and one end of the spring 30 is supported by the lower casing frame and is installed in a state in which the spring biases the locker 21.

However, according to the battery pack locking device of the conventional mobile phone, since a fingernail of a user is inserted into the locker and then the locker is pulled and is slidably moved horizontally, the fingernail is occasionally bent and crushed.

Further, the battery pack locking device of the conventional mobile phone cannot perform any additional functions. For example, it cannot perform a lens cover function or a button function.

Furthermore, according to the battery pack locking device of the conventional mobile phone, since a separate mounting space should be formed to mount the battery pack onto the mounting portion of the lower casing frame, the size of the phone is larger due to the mounting space of the phone making the phone less attractive.

SUMMARY OF THE INVENTION

Accordingly, the present invention has been made to solve the above-mentioned problems occurring in the prior art, and an object of the present invention is to provide a battery pack locking device which facilitates separation and engagement of a battery pack by constituting a locking device that attaches or detaches the battery pack to and from a phone body as a cover of a camera lens module is slidably moved.

Another object of the present invention is to provide a battery pack locking device of a mobile phone which performs a battery pack attaching function as well as a cover function of a camera lens module, thereby excluding use of separate parts of locking device and thus miniaturizing the phone.

To accomplish these object, there is provided a sliding cover; a push locker moved upwardly or downwardly according to movement of the sliding cover; a slide locker portion slidably moved according to the upward or downward movement of the push locker portion to restrict or release the battery pack; and a resilient member providing a resilient force so that the slide locker portion can be slidably moved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings.

Figure 1:
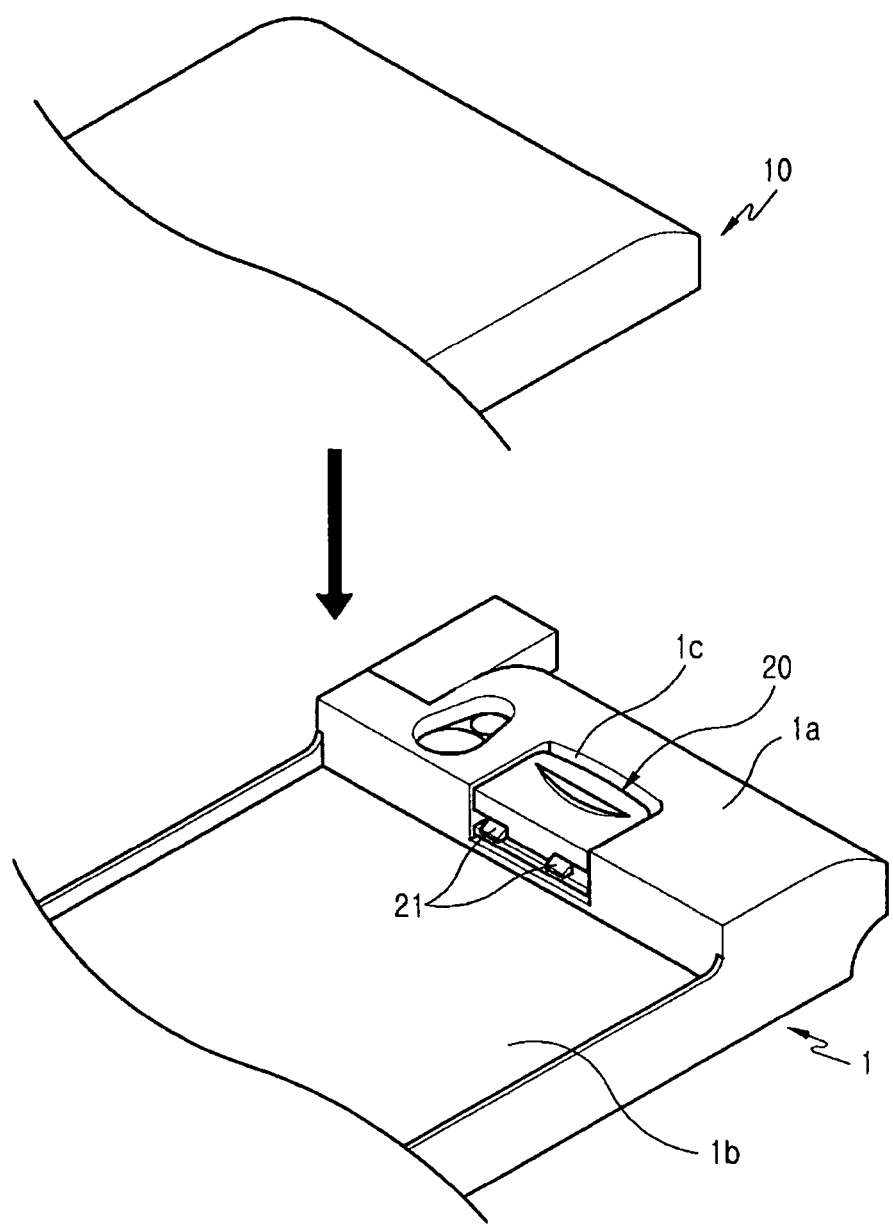
FIG. 1 is a perspective view for showing a battery pack locking device of a conventional mobile phone.
Figure 2:
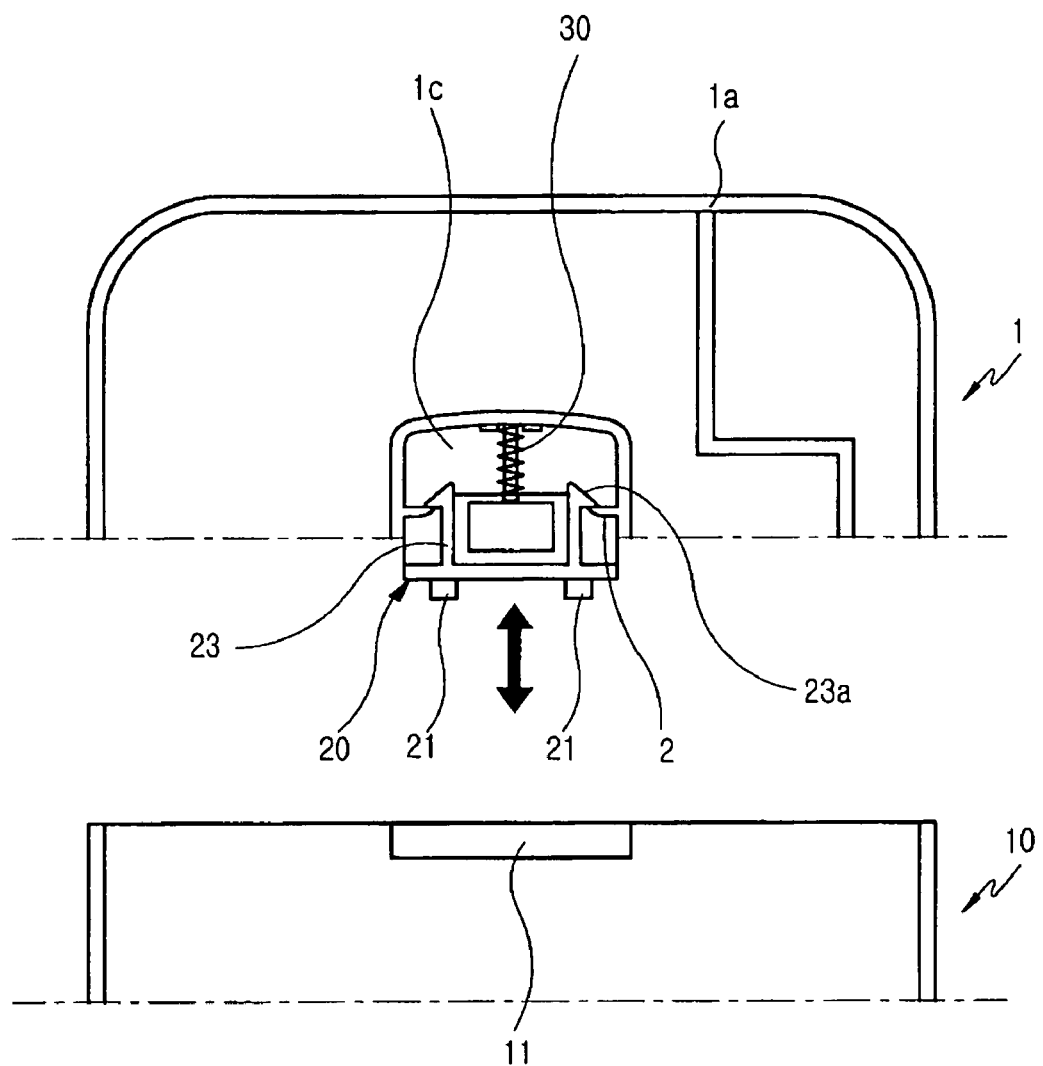
FIG. 2 is a cut-away plan view for showing a battery pack locking device of a conventional mobile phone.
Figure 3:
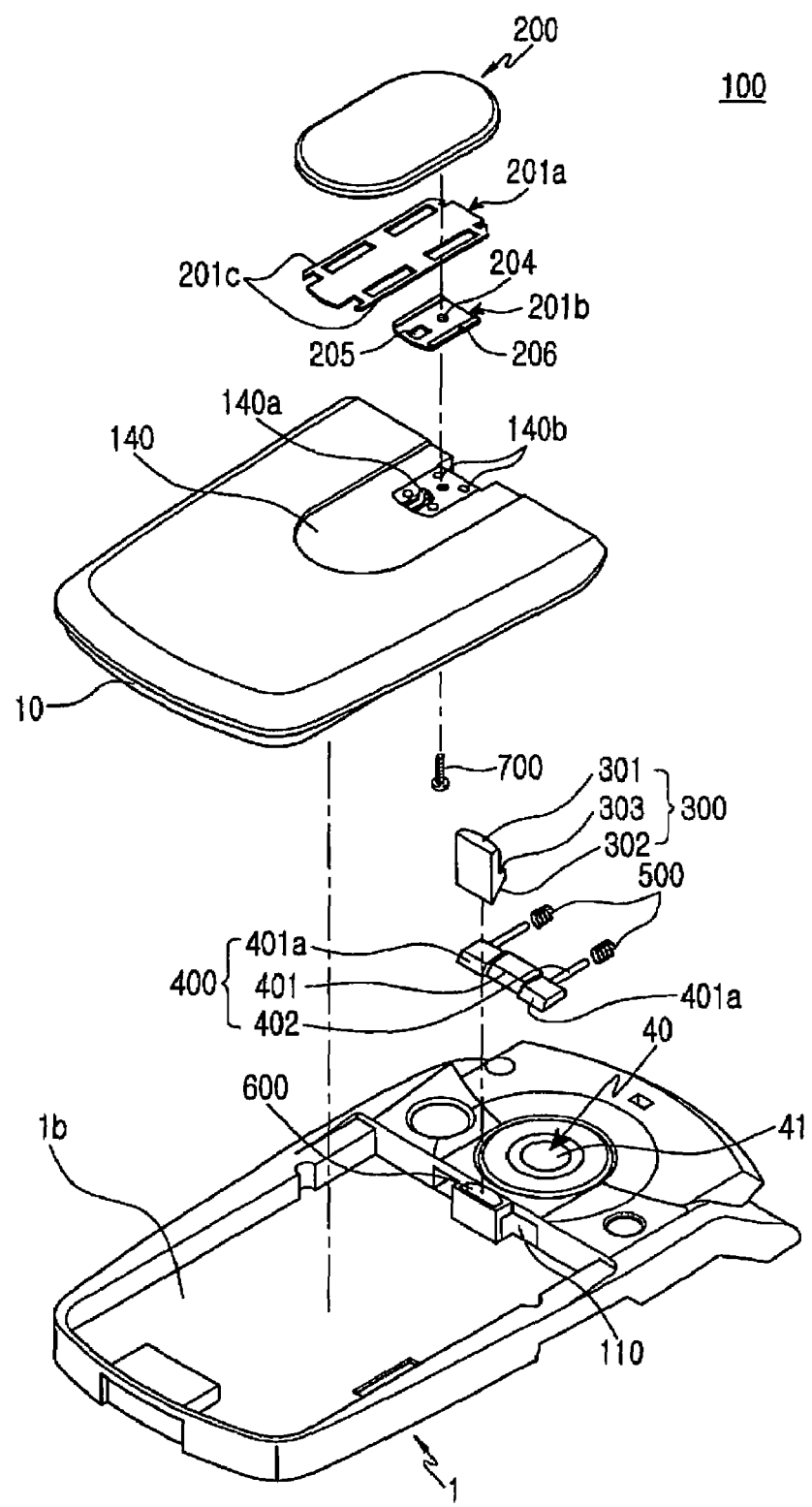
FIG. 3 is an exploded perspective view for showing the structure of a battery pack locking device of a mobile phone according to an embodiment of the present invention.
Figure 4:
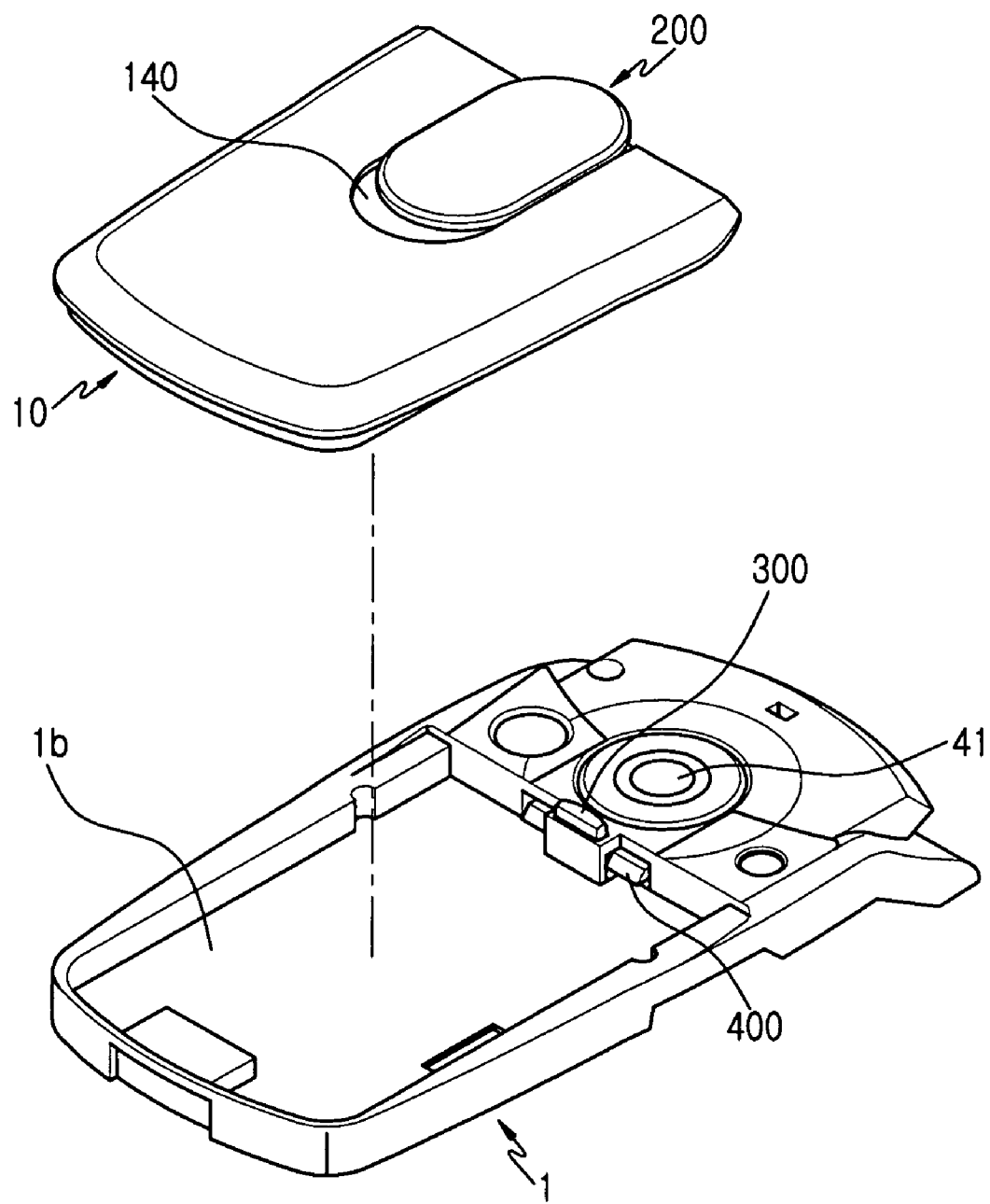
FIG. 4 is an exploded perspective view for showing a battery pack locking device of a mobile phone according to a preferred embodiment of the present invention, in a state before the battery pack and the phone body are combined.

As shown in FIGS. 3 and 4, a battery pack locking device 100 of a mobile phone according to the present invention includes a sliding cover 200, push locker portion 300, a slide locker portion 400, and resilient members 500. The sliding cover 200 is provided at a position adjacent to a camera lens module (not shown) provided in a phone body 1, and is mounted to a mounting portion 140 formed in the battery pack 10 so as to be slidably moved on a rear surface of the phone body 1.

The push locker portion 300 is provided on a rear surface of the phone body 1 and is moved upwardly or downwardly according to slidable movement of the sliding cover 200. The slide locker portion 400 is provided at a position adjacent to the push locker portion 300 so as to be slidably moved according to upward or downward movement of the push locker portion 300 to restrict or release the battery pack 10. The resilient member 500 is provided at a position adjacent to the slide locker portion 400 to provide a resilient force so that the slide locker portion 400 can be slidably moved.

Figure 12:
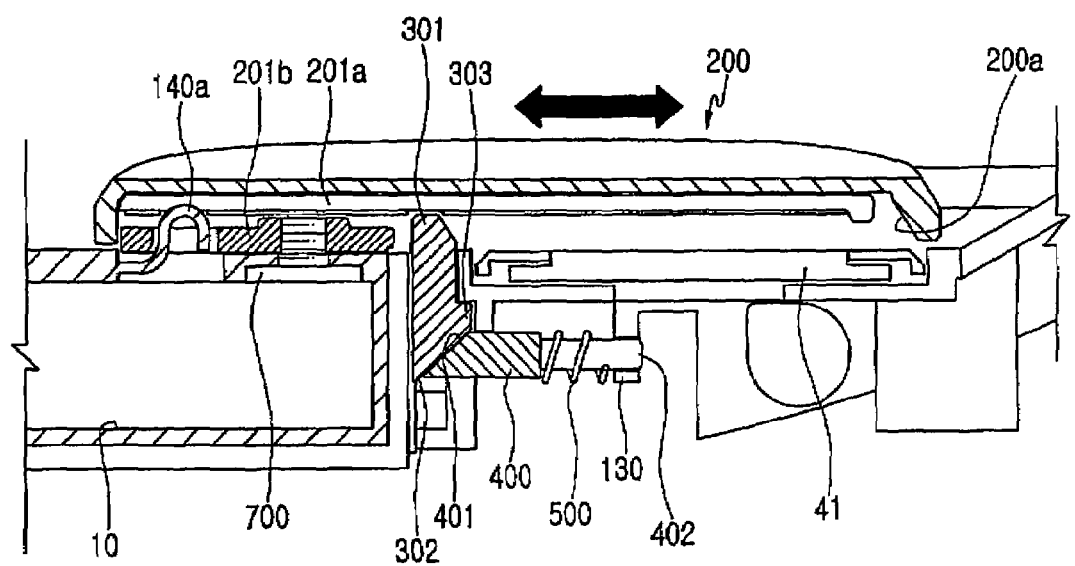
FIG. 12 is a side cross-sectional view for showing a battery pack locking device of a mobile phone according to a preferred embodiment of the present invention before operation of the battery pack locking device.
Figure 13:
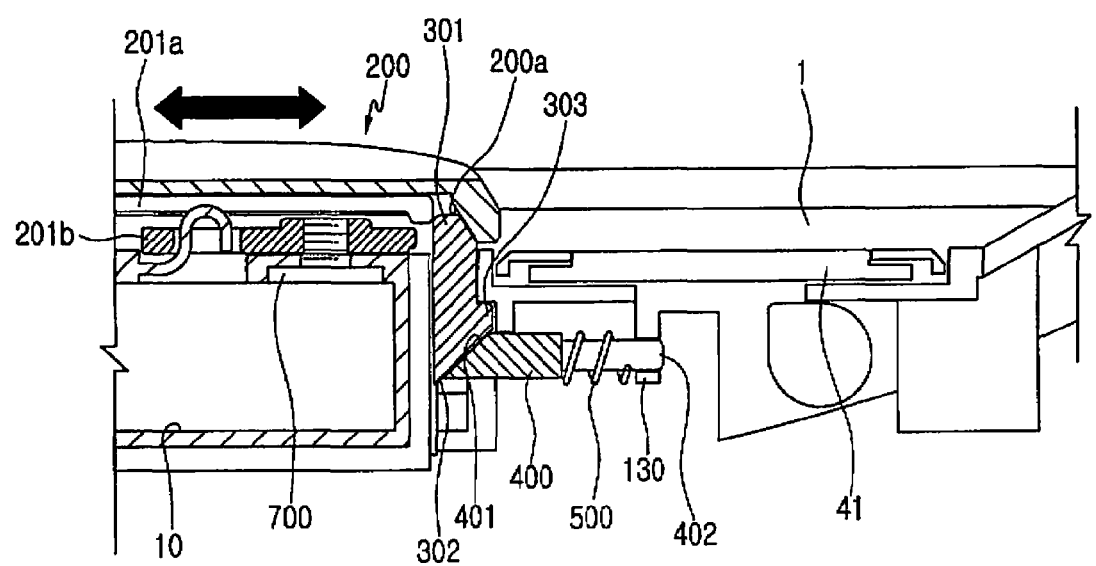
FIG. 13 is a side cross-sectional view for showing a battery pack locking device of a mobile phone according to a preferred embodiment of the present invention during operation of the battery pack locking device; and, FIG. 14 is a side cross-sectional view for showing a battery pack locking device of a mobile phone according to a preferred embodiment of the present invention after operation of the battery pack locking device.

As shown in FIG. 3, the sliding cover 200 is mounted to the mounting portion formed in the battery pack 10 so as to be slidably movable on the rear surface of the phone body 1 and the battery pack 10. As shown in FIGS. 12 and 13, the sliding cover 200 opens or closes a lens opening 41 of a camera lens module (not shown) as it is slidably moved in the lengthwise direction of the body 1.

Figure 5:
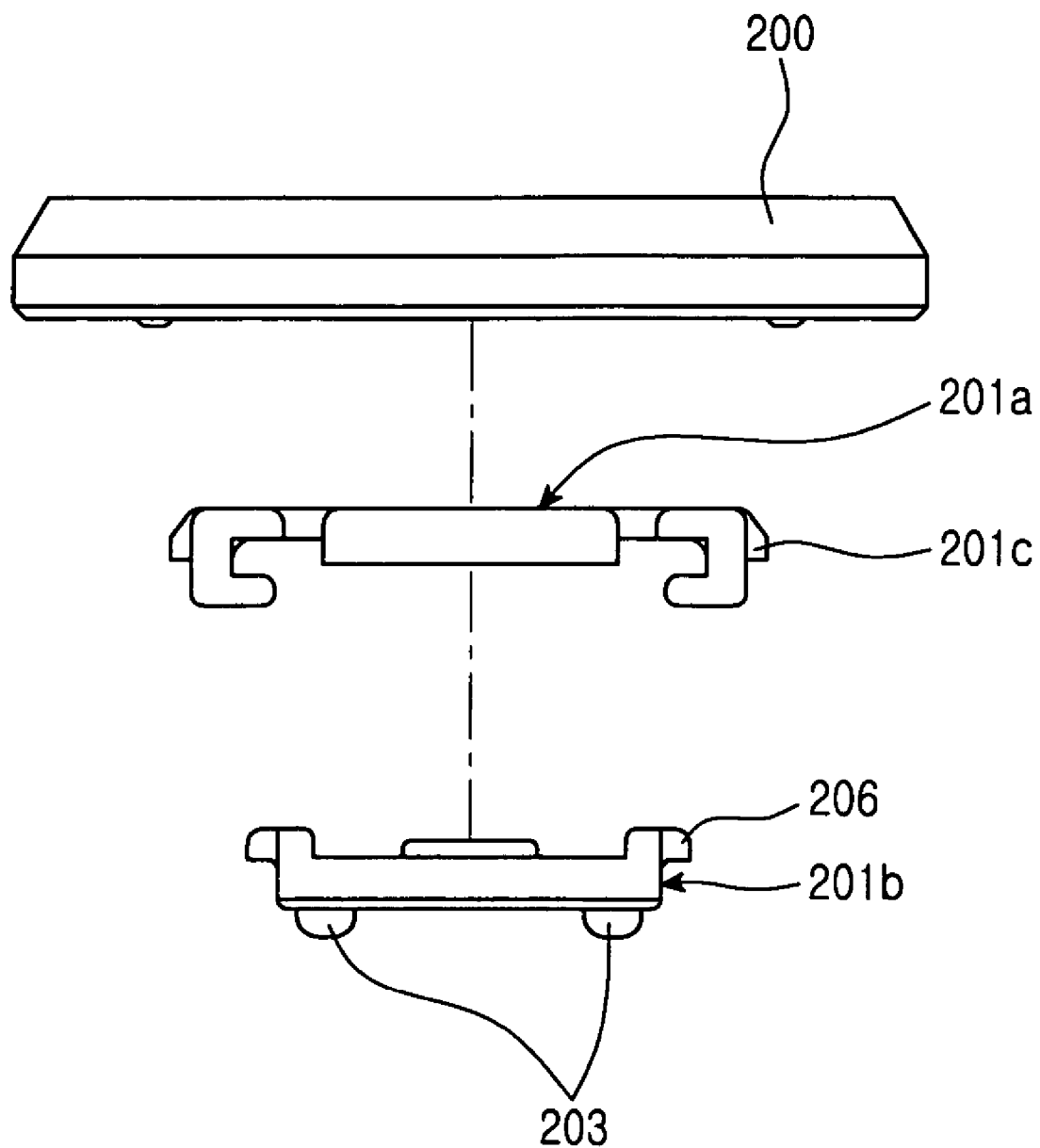
FIG. 5 is a front view for showing a sliding cover of a battery pack locking device of a mobile phone according to a preferred embodiment of the present invention before combination of the sliding cover.
Figure 6:
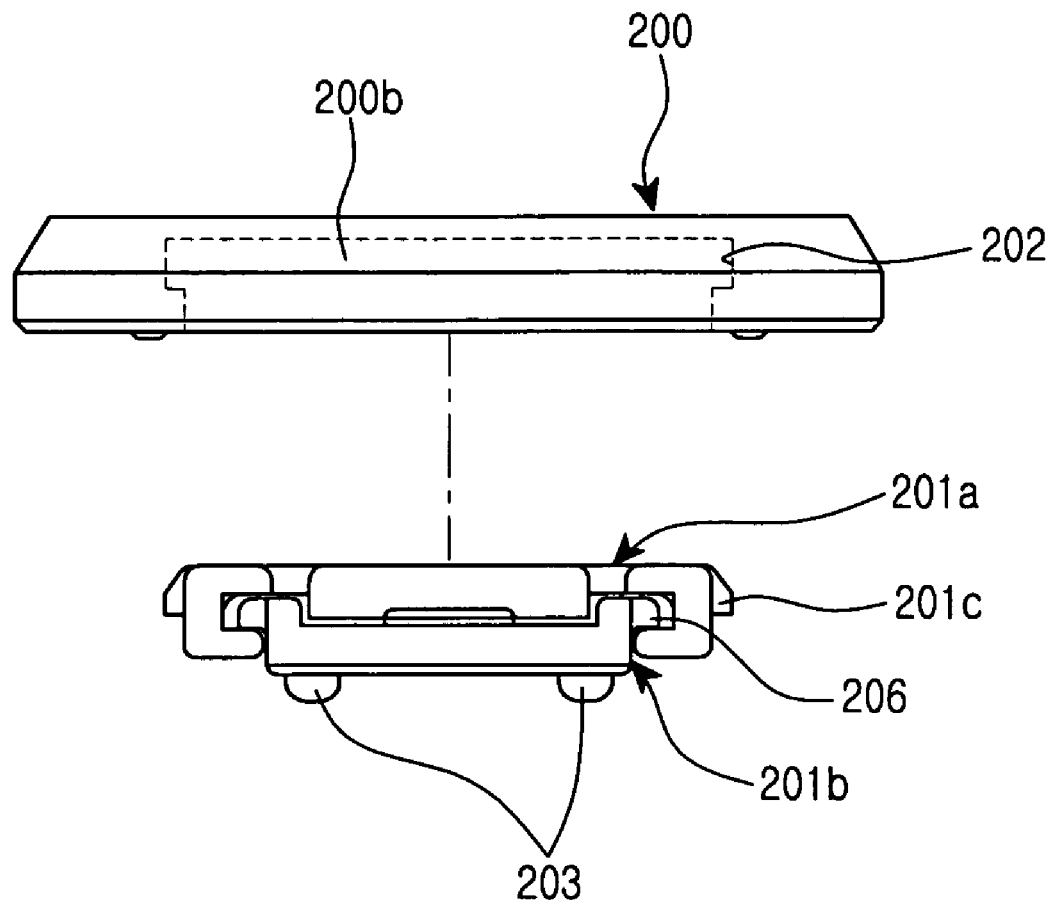
FIG. 6 is a front view for showing a sliding cover of a battery pack locking device of a mobile phone according to a preferred embodiment of the present invention after combination of the sliding cover.
Figure 7:
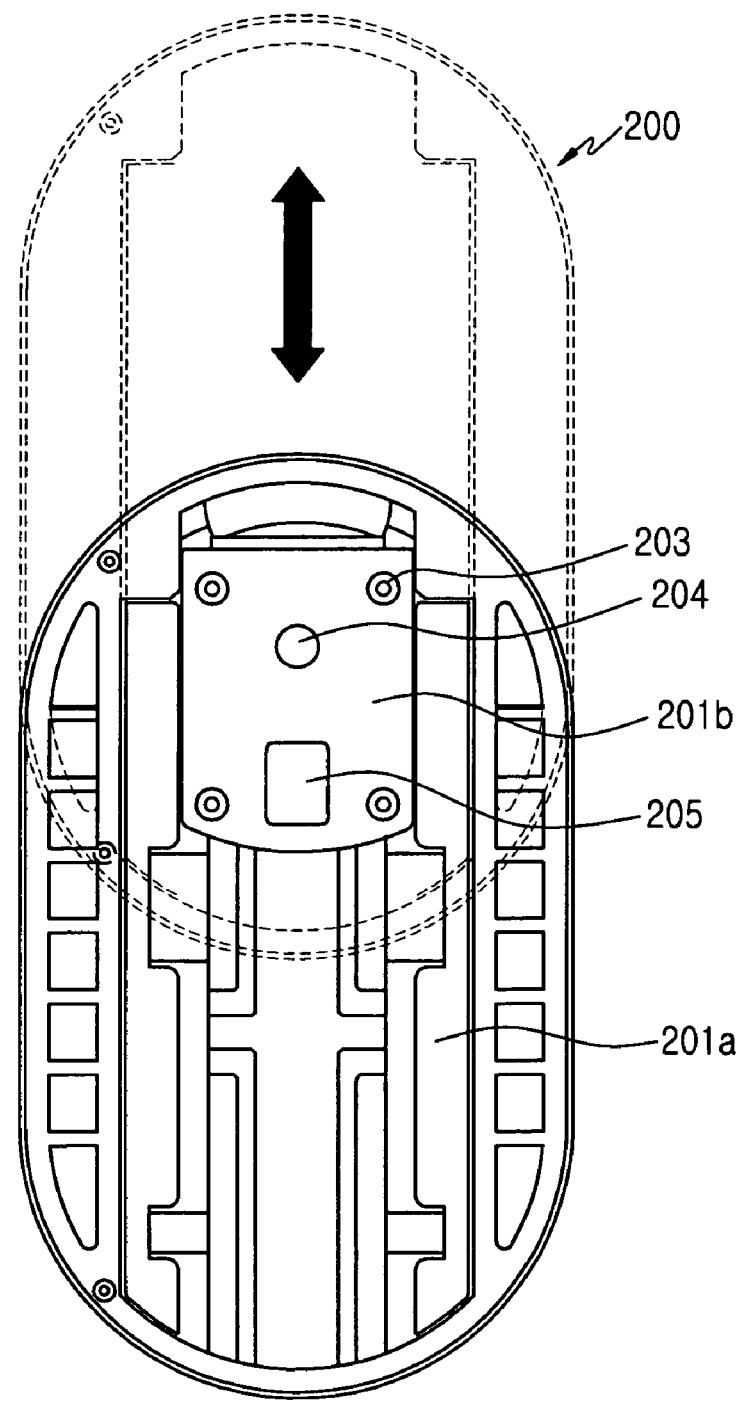
FIG. 7 is a plan view for showing a sliding cover of a locking device of a mobile phone according to a preferred embodiment of the present invention in an operation state.

As shown in FIGS. 5 to 7, a cover guide means 201 is provided in the sliding cover 200 to guide its movement. The cover guide means 201 includes a guide rail 201a and a guide portion 201b. The guide rail 201a is mounted to a rear surface of the sliding cover 200 so as to engage with the guide portion 201b and to guide the sliding cover 200 when the sliding cover 200 is slidably moved. A mounting space 200b is formed on a rear surface of the sliding cover 200 to mount the guide rail 201a thereto. The guide portion 201b is mounted onto the guide rail 201a so as to be guided along the guide rail 201a. Hooks 201c are formed on both sides of one end of the guide rail 201a so as to be caught by catching recesses formed on a rear surface of the cover 200 and then fixed in the caught position.

Figure 8:
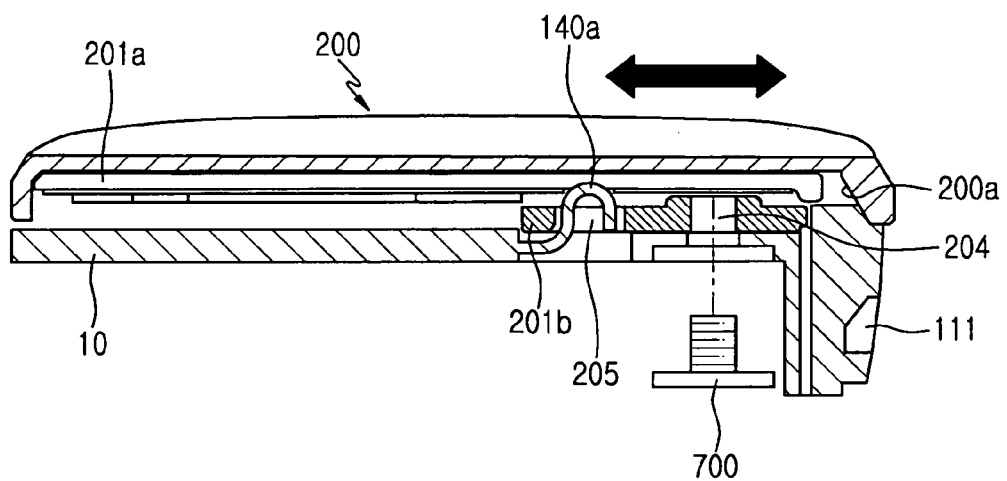
FIG. 8 is a side view for showing a sliding cover of a locking device of a mobile phone according to a preferred embodiment of the present invention in a combination state.

As shown in FIG. 5, at least one fixing member 203 is formed in the guide portion 201b so as to be inserted into the mounting portion 140 of the battery pack 10 and then to be fixed in the inserted position. As shown in FIG. 8, a screw hole 204 is formed in the fixing member 203 to engage the fixing member 203 with the battery pack 10 by using a screw 700. A hook hole 205 is formed at a position adjacent to the screw hole 204 so as to be caught by a catching hook provided in the mounting portion 140 to be fixed. Guide bosses 206 are formed on both side of one end of the guide portion 201b so as to be engaged with the guide rail 201a so that the guide rail 201a is guided during movement.

Figure 9:
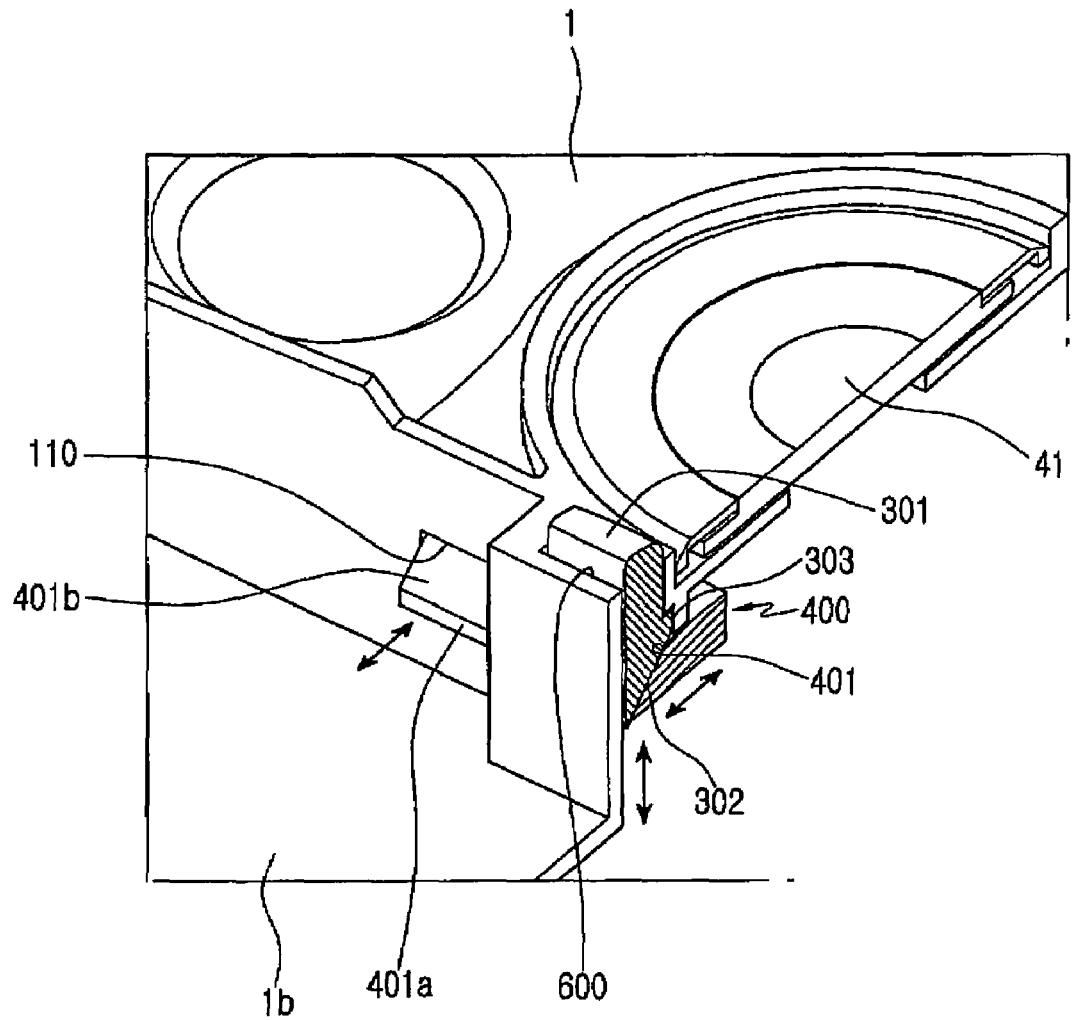
FIG. 9 is a cut-away perspective view for showing an operation process of a locking device of a mobile phone according to a preferred embodiment of the present invention in a combination state.

As shown in FIG. 9, a guide hole 600 is formed on a rear surface of the body 1 to mount the push locker portion 300 thereto and guide the push locker portion 300 so that the push locker portion 300 is moved upwardly or downwardly.

As shown in FIGS. 10 to 14, a first guide surface 301 is formed at an upper end of the push locker portion 300 so as to make contact with a guide inclining surface 200a formed on the inner side of the sliding cover 200 to guide the upward or downward movement of the push locker portion 300. A second guide surface 302 is formed at a lower end of the push locker portion so as to make contact with a guide inclining surface formed in the slide locker portion 400 to guide the slidable movement of the slide locker portion 400.

As shown in FIG. 12, a locker side deviation preventing jaw 303 is formed in the push locker portion 300 to prevent deviation of the push locker portion 300 during upward or downward movement.

Figure 11:
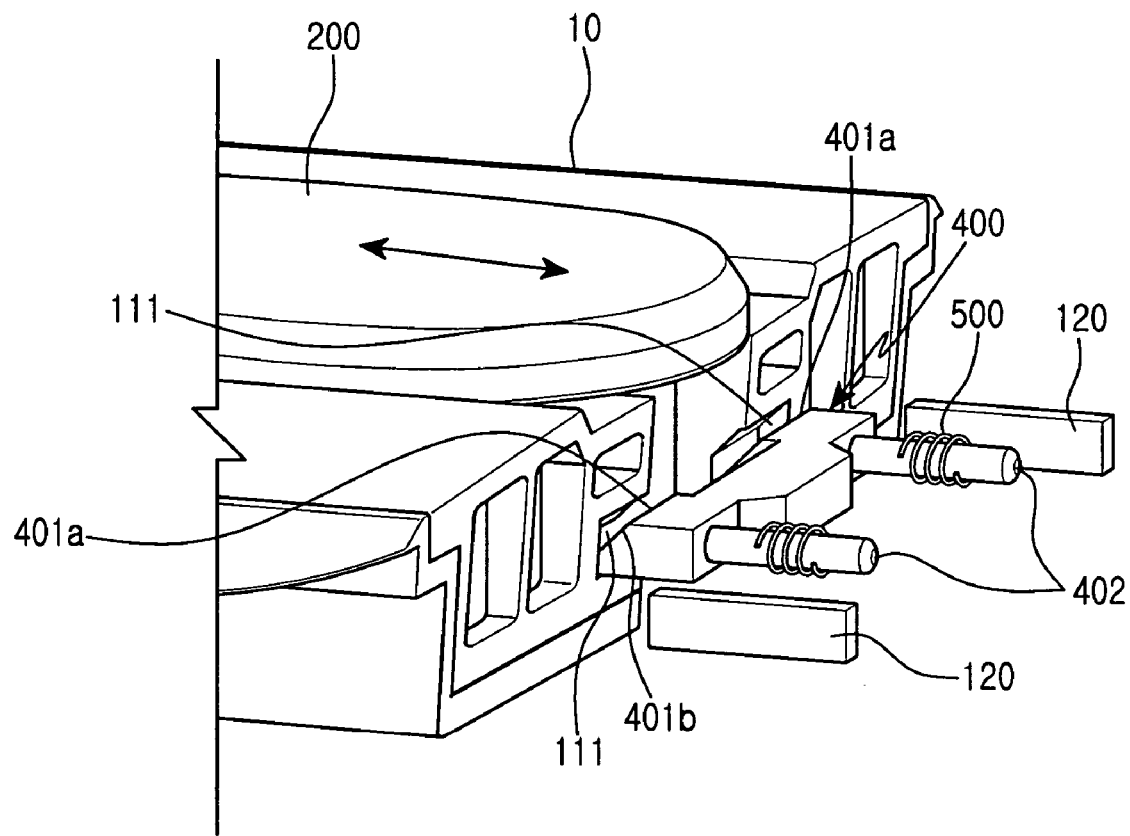
FIG. 11 is a cut-away perspective view for showing operation of a slide locker portion of a locking device of a mobile phone according to a preferred embodiment of the present invention.

As shown in FIG. 3, a locker side mounting portion 110 is formed on a rear surface of the body 1 to mount the slider locker portion 400 and to slidably move the slide locker portion 400. As shown in FIG. 11, a pair of guide members 120 are formed in the locker side mounting portion 110 to guide the slide locker portion 400 during slidable movement. As shown in FIG. 12, a pair of spring support members 130 are formed in the guide members 120 so as to engaged with the resilient member 500 and to support the resilient member 500.

As shown in FIGS. 12 and 13, the resilient member 500 comprises at least one coil spring. A guide inclining surface is formed at one end of the slide locker portion 400 so as to make contact with the second guide surface 302 of the push locker portion 300, and a pair of spring bosses 402 are formed at the other end of the slide locker portion 400 so as to be engaged with the coil spring 500 to support the coil spring 500.

Figure 14:
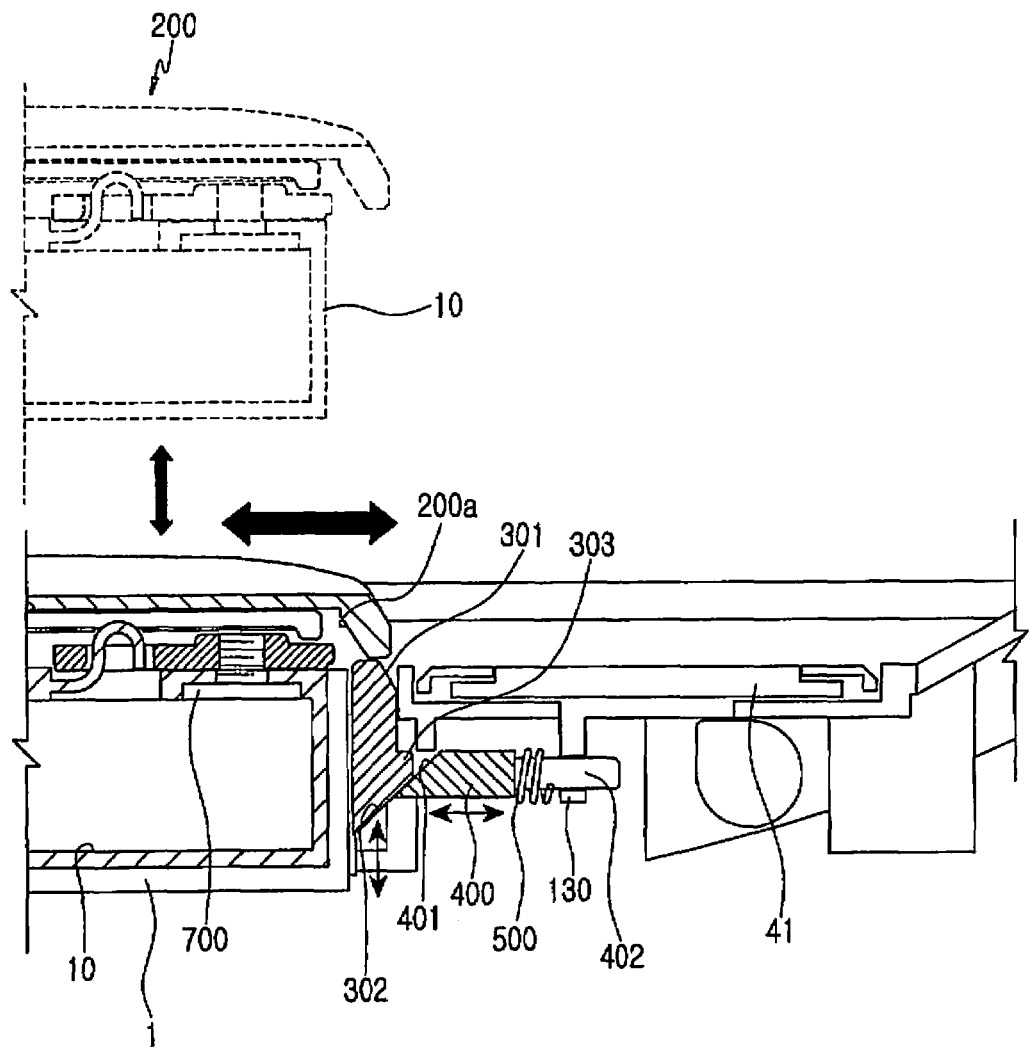

As shown in FIG. 14, the guide inclining surface 401 is formed at a central portion of the slide locker portion 400. A pair of locker side hooks 401a are formed on both sides of the guide inclining surface 401 so as to be restricted by being caught by the catching recesses 111 formed in the battery pack or released. A hook side engaging surfaces 401b are formed in the locker side hooks 401a so as to be in contact with the battery pack 10 and to be engaged with the battery so that the locker side hooks 401a are inserted into the catching recesses 111 of the battery pack 10 when the battery pack 10 is mounted onto the mounting surface 1b formed in the body 1 of the phone.

As shown in FIG. 14, a camera lens module (not shown) is provided on a rear surface of a body 1 of the phone, and a battery pack 10 is attached to and detached from the body 1 of the phone.

As shown in FIGS. 3 and 4, a sliding cover 200 for opening/closing a lens opening 41 of the camera lens module (not shown) by sliding movement thereof is provided in the battery pack 10.

As shown in FIGS. 5 and 6, a guide rail 201a is mounted onto a rear surface of the sliding cover 200, and since hooks 201c caught by a cover side catching recess 202 formed on a rear surface of the cover 200 to be fixed thereto are formed at both ends of the guide rail 201a, the hooks 201c of the guide rail 201a is inserted into the cover side catching recess 202 to be fixed thereto.

Then, as shown in FIG. 6, a guide portion 201b engaged with the guide rail 201a is provided in the battery pack 10.

As shown in FIGS. 7 and 8, since at least one fixing member 203 is formed in the guide portion 201 so as to be inserted into the recess 140b formed in a mounting portion 140 of the battery pack 10 to be fixed thereto, the fixing member 203 of the guide portion 201b is inserted into and fixed to the recess 140b of the mounting portion 140. In addition, since a screw hole 204 is formed at a position adjacent to the fixing member 203 so as to be engaged with the battery pack 10 by using a screw 700, the screw 700 is engaged with the screw hole 204.

Then, as shown in FIG. 8, since a hook hole 205 is formed at a position adjacent top the screw hole 204 so as to be caught by and fixed to a catching hook 140a provided in the mounting portion 140, the catching hook 140a is inserted into and fixed to the hook hole 205 of the guide portion 201b when the sliding cover is engaged with the mounting portion 140 of the battery pack 10. The guide rail 201a is engaged with guide bosses 206 formed on both sides of one end of the guide portion 201b so as to be movably guided.

Then, as shown in FIG. 12, when the battery pack 10 needs to be separated from the body of the phone, the sliding cover 200 is slidably moved in the lengthwise direction of the body.

Then, as shown in FIGS. 9 and 13, the guide rail 201a is slidably moved together with the sliding cover 200. The guide rail 201a is guided by the guide portion 201b. Then, a guide inclining surface 200a formed on the inner side of the sliding cover 200 is guided together with the guide rail 201a, and makes contact with a first guide surface 301 formed at an upper end of the push locker portion 300.

Figure 10:
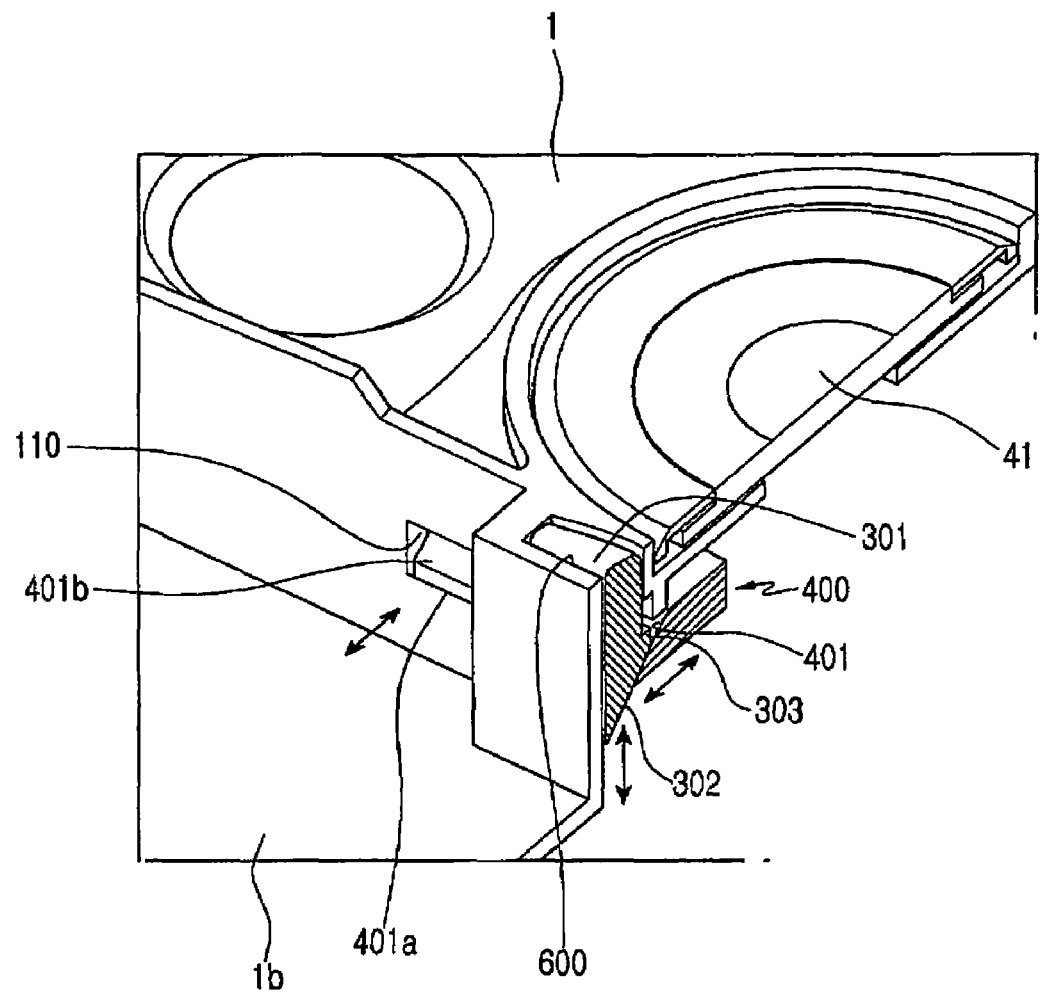
FIG. 10 is a cut-away perspective view for showing a state after a locking device of a mobile phone according to a preferred embodiment of the present invention is operated.

Then, as shown in FIGS. 10 and 14, the first guide surface 301 makes contact with the guide inclining surface 200a of the sliding cover 200 and moves the push locker portion 300 from the upper side to the lower side.

A second guide surface 302 formed at a lower end of the push locker portion 300 makes contact with the guide inclining surface 401 formed in the slide locker portion 400 and slidably moves the slide locker portion 400 from the left side to the right side.

Then, as shown in FIG. 11 and 14, a pair of locker side hooks 401a formed in the slide locker portion 400 are deviated from the catching recesses 111 formed in the battery pack 10, and are separated from the body 1 of the phone.

As shown in FIG. 14, the sliding cover 200 is separated together with the battery pack 10.

As shown in FIG. 12, the slide locker portion 400 is slidably moved by the resilient force of coil springs 500 provided in the slide locker portion 400 to an original position.

Then, as shown in FIG. 13, the push locker portion 300 is moved from the lower side to the upper side, and is prevented from being deviated from the guide hole by a locker side deviation preventing jaw 303 formed in the push locker portion 300.

Here, in case of mounting the battery pack again, if the battery pack 10 is mounted onto the mounting surface 1b, the locker side hooks 401a formed in the slide locker 400 make contact with the catching recesses 111 of the battery pack and are pushed and slidably moved. At the same time, the battery pack 10 is mounted onto the mounting surface 1b, and the locker side hooks 401a are slidably moved to the original position by the resilient forces of the coil springs 500 and are caught by the catching recesses 111.

Then, as shown in FIG. 11, when the battery pack 10 is mounted to the body of the phone, the battery pack 10 and the hook side engaging surface 401b make contact with the locker side hooks 401a and is guided, the engagements of the hooks 401a in the catching recess 111 of the battery pack 10 become facilitated.

In this state, as shown in FIGS. 8 and 12, if the sliding cover 200 is slidably moved in the lengthwise direction thereof, the lens opening 41 of the camera lens module (not shown) can be closed.

In addition, as shown in FIG. 13, to open the lens opening 41 without separating the battery pack from the body 1, the sliding cover 200 is slidably moved to a predetermined position.

Then, the guide rail 201a of the sliding cover 200 is guided by the guide portion 201b of the battery pack 10 as it is slidably moved.

As described above, according to the present invention, a battery attaching function as well as a covering function of a lens opening can be provided. In addition, since the structure of the locking device is simple, the size of the phone can be miniaturized. Further, since a separate locking button is not needed, appearance can be improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile phone having a camera lens module and a battery pack, which comprises:
   a sliding cover;
   a push locker portion upwardly or downwardly movable according to movement of the sliding cover;
   a slide locker portion slidably moved according to the upward or downward movement of the push locker portion to restrict or release the battery pack; and
   a resilient member providing a resilient force so that the slide locker portion can be slidably moved,
   wherein the sliding cover is provided in the battery pack and is slidably moved from the battery pack, thereby allowing the battery pack to be separated from a body of the mobile phone and to be mounted onto the body, and
   wherein a lens opening of the camera lens module is opened or closed according to a movement of the sliding cover.

2. The mobile phone according to claim 1, wherein the sliding cover is mounted to a mounting portion formed in the battery pack.

3. The mobile phone according to claim 1, wherein the sliding cover comprises a cover guide means for slidably guiding the sliding cover.

4. The mobile phone according to claim 3, wherein the cover guide means comprises a guide rail mounted onto a rear surface of the sliding cover and a guide portion movably guided along the guide rail.

5. The mobile phone according to claim 4, wherein hooks caught by and fixed to a cover side catching recess formed on a rear surface of the sliding cover are formed on both sides of one end of the guide rail.

6. The mobile phone according to claim 4, wherein the guide portion comprises:
    at least one fixing member to be inserted into and fixed to a recess formed in a mounting portion of the battery pack,
    a screw hole formed at a position adjacent to the fixing member so as to be engaged with the battery pack using a screw,
    a hook hole caught by and fixed to a catching hook provided in the mounting portion and formed at a position adjacent to the screw hole, and
    guide bosses engaged with the guide rail so that the guide rail is movably guided and formed on both sides of one end of the guide portion.

7. The mobile phone according to claim 1, wherein a guide hole is formed on a rear surface of the body of the mobile phone for mounting a push locker and guiding the push locker portion so that the push locker is upwardly or downwardly movable.

8. The mobile phone according to claim 1, wherein a first guide surface is formed at an upper end of the push locker portion so as to make contact with a guide inclining surface formed on an inner side of the sliding cover as the sliding cover is slidably moved, and a second guide surface is formed at a lower end of the push locker portion so as to make contact with a guide inclining surface formed in the slide locker portion to guide the slidable movement of the slide locker portion.

9. The mobile phone according to claim 1, wherein a locker side deviation preventing jaw is formed in the push locker portion to prevent deviation of the push locker portion during the upward or downward movement of the push locker portion.

10. The mobile phone according to claim 7, wherein a locker side deviation preventing jaw is formed in the push locker portion to prevent deviation of the push locker portion from the guide hole during the upward or downward movement of the push locker portion.

11. The mobile phone according to claim 1, wherein a locker side mounting portion for mounting the slide locker is formed on a rear surface of the mobile phone, a pair of guide members for guiding the slide locker portion so that the slide locker portion is slidably moved are formed on the locker side mounting portion, and a pair of spring support members for supporting the resilient member are formed in the guide members.

12. The mobile phone according to claim 1, wherein the resilient member comprises at least one coil spring.

13. The mobile phone according to claim 1, wherein a guide inclining surface making contact with a second guide surface of the push locker portion is formed at one end of the slide locker portion, and a pair of spring bosses engaged with the coil springs for supporting the coil springs are formed at the other end of the slide locker portion.

14. The mobile phone according to claim 13, wherein the guide inclining surface is formed at a central portion of the slide locker portion and a pair of locker side hooks caught by or released from catching recesses formed in the battery pack are formed on both sides of the guide inclining surface.

15. The mobile phone according to claim 14, wherein hook side engaging surfaces are formed in the locker side hooks so that the locker side hooks make contact with the battery pack and are engaged with the battery pack so as to guide the battery pack.

* * * * *